United States Patent
Abe

(10) Patent No.: US 10,044,100 B2
(45) Date of Patent: Aug. 7, 2018

(54) ON-VEHICLE RADAR DEVICE

(71) Applicant: NIDEC ELESYS CORPORATION, Kawasaki-shi, Kanagawa (JP)

(72) Inventor: Akira Abe, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 60 days.

(21) Appl. No.: 15/375,349

(22) Filed: Dec. 12, 2016

(65) Prior Publication Data
US 2017/0187102 A1 Jun. 29, 2017

(30) Foreign Application Priority Data
Dec. 24, 2015 (JP) ................. 2015-251953

(51) Int. Cl.
*H01Q 1/32* (2006.01)
*G01S 13/93* (2006.01)
*H01Q 1/48* (2006.01)
*H01Q 21/24* (2006.01)

(52) U.S. Cl.
CPC ......... *H01Q 1/3283* (2013.01); *G01S 13/931* (2013.01); *H01Q 1/48* (2013.01); *H01Q 21/24* (2013.01); *G01S 2013/9389* (2013.01)

(58) Field of Classification Search
CPC .............. H01Q 1/32; H01Q 1/48; H01Q 21/24
USPC ....................................................... 343/713
See application file for complete search history.

(56) References Cited

U.S. PATENT DOCUMENTS

| | | | | |
|---|---|---|---|---|
| 6,246,365 B1 * | 6/2001 | Tokoro | ................ | G01S 13/42 342/149 |
| 8,427,360 B2 * | 4/2013 | Longstaff | ............. | G01S 13/882 340/945 |
| 9,081,086 B2 * | 7/2015 | Nakamura | ............. | G08G 1/166 |
| 9,547,076 B2 * | 1/2017 | Linnig | ................ | G01S 13/02 |
| 9,798,001 B2 * | 10/2017 | Aizawa | ................ | G01S 13/42 |
| 2009/0245411 A1 * | 10/2009 | Goldberg | ............. | H01Q 1/241 375/267 |
| 2012/0119937 A1 | 5/2012 | Yamada et al. | | |

FOREIGN PATENT DOCUMENTS

| | | | |
|---|---|---|---|
| JP | 2011-27695 A | 2/2011 | |
| JP | 5610983 B2 | 10/2014 | |

* cited by examiner

*Primary Examiner* — Huedung Mancuso
(74) *Attorney, Agent, or Firm* — Keating & Bennett, LLP

(57) ABSTRACT

In an on-vehicle radar device, a receiving antenna part includes a first antenna array with a plurality of receiving antennas arranged in a first direction perpendicular to a predetermined reference direction, and a second antenna array with three or more receiving antennas arranged in a second direction perpendicular to the reference direction and different from the first direction. A computing part computes the elevation angle of an object, using a first detection angle formed by the reference direction and a direction of the object acquired using the first antenna array in a plane parallel to the reference direction and the first direction, a second detection angle formed by the reference direction and a direction of the object acquired using the second antenna array in a plane parallel to the reference direction and the second direction, and a relative inclination angle formed by the first and second directions.

20 Claims, 8 Drawing Sheets

ON-VEHICLE RADAR DEVICE

TECHNICAL FIELD

The present invention relates to an on-vehicle radar device.

BACKGROUND ART

Research on areas such as collision avoidance, driving assistance, and automatic driving has been conducted in recent years, using technology for detecting objects around a vehicle with radar. For example, a radar device is provided in the front part of a vehicle and near the ground surface and detects the distance to and azimuth angle of an object. Sometimes the elevation angle of an object may also be required to be detected. Japanese Patent Application Laid-Open No. 2011-27695 discloses a radar device that can also detect the position of an object in the up-down direction. The radar device includes three element antennas arranged in the right-left direction, with the middle element antenna deviated in the up-down direction. The middle element antenna and the right-side element antenna detect the angle of an object in a first oblique direction, and the left-side element antenna and the middle element antenna detect the angle of the object in a second oblique direction. The detected two angles are used to obtain the position of the object in the up-down direction.

An on-vehicle radar device receives aground reflected wave and a direct wave by its receiving antennas, the ground reflected wave reaching the receiving antennas via a ground surface from an object, and the direct wave reaching the receiving antennas directly from the object. The radar device disclosed in Japanese Patent Application Laid-Open No. 2011-27695 detects two angles in the first and second oblique directions from a combined wave of the ground reflected wave and the direct wave and uses these angles to calculate the position of the object in the up-down direction. This requires complicated processing such as obtaining an average and variance of the positions in the up-down direction of the object that are measured for a predetermined period of time and then obtaining a corrected position of the object in the up-down direction.

The elevation angle of the object may be easily obtained by arranging a plurality of receiving antennas two-dimensionally. However, narrowing an existence range of the receiving antennas in a predetermined direction is also necessary because a vehicle has only limited available space for mounting the radar device.

SUMMARY OF INVENTION

The present invention is intended for an on-vehicle radar device, and it is an object of the present invention to easily obtain the elevation angle of an object while narrowing the existence range of receiving antennas in a predetermined direction.

An on-vehicle radar device according to an exemplary embodiment of the present invention includes a transmitting antenna part for transmitting a transmission wave, a receiving antenna part for receiving a reflected wave arising from the transmission wave, and a computing part for receiving a signal from the receiving antenna part. The receiving antenna part includes a first antenna array with a plurality of receiving antennas arranged in a first direction perpendicular to a predetermined reference direction, and a second antenna array with three or more receiving antennas arranged in a second direction that is perpendicular to the reference direction and different from the first direction. When the first direction is a horizontal direction in a state in which the on-vehicle radar device is fixed to a vehicle body of a vehicle, the number of the plurality of receiving antennas included in the first antenna array is two or more, and when the first direction is not a horizontal direction, the number of the plurality of receiving antennas is three or more. When the receiving antenna part is viewed in the first direction, at least part of an existence range of each receiving antenna included in the second antenna array in a direction perpendicular to the reference direction overlaps with the first antenna array. The computing part computes an elevation angle of an object with respect to a horizontal plane, using a first detection angle, a second detection angle, and a relative inclination angle. The first detection angle is an angle formed by the reference direction and a direction of the object acquired using the first antenna array in a plane that is parallel to the reference direction and the first direction. The second detection angle is an angle formed by the reference direction and a direction of the object acquired using the second antenna array in a plane that is parallel to the reference direction and the second direction. The relative inclination angle is an angle formed by the first direction and the second direction.

According to the present invention, the receiving antenna part can easily obtain the elevation angle of an object while narrowing the existence range of the receiving antennas in a direction perpendicular to the reference direction and the first direction.

These and other objects, features, aspects and advantages of the present invention will become more apparent from the following detailed description of the present invention when taken in conjunction with the accompanying drawings.

DESCRIPTION OF EMBODIMENTS

Figure 1:
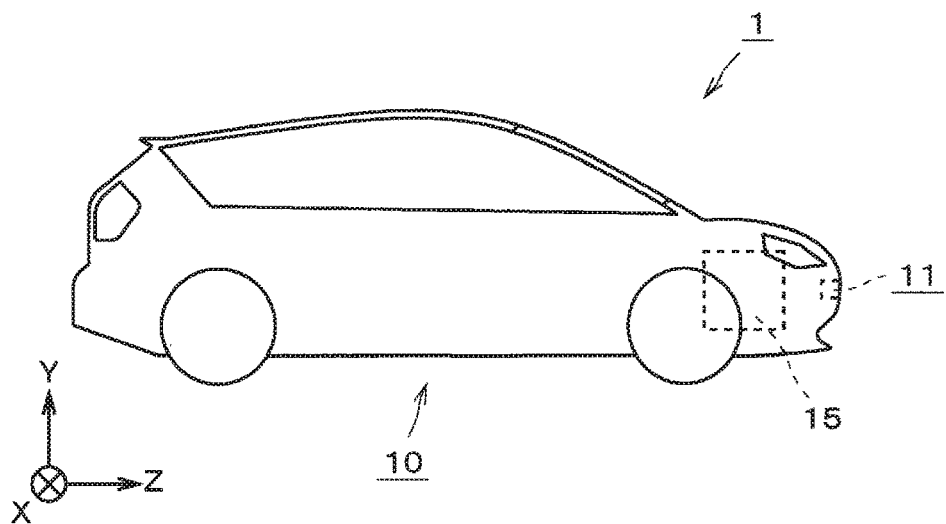
FIG. 1 is a simplified side view of a vehicle.

FIG. 1 is a simplified side view of a vehicle that includes an on-vehicle radar device 11 (hereinafter, referred to as a "radar device") according to an exemplary embodiment of the present invention. In FIG. 1, X, Y, and Z directions that are orthogonal to one another are indicated by arrows. The X, Y, and Z directions correspond respectively to width, up-down, and lengthwise directions of the vehicle 1. The same applies to drawings described below. The following description is based on the condition that the vehicle 1 is disposed with its width and lengthwise directions being horizontal. That is, the X and Z directions are horizontal directions. The Z direction is a direction of travel of the vehicle 1 moving straight ahead, and is thus hereinafter also referred to as a "reference direction."

The vehicle 1 includes a vehicle body 10, a drive mechanism 15 for moving the vehicle body 10, and the radar device 11 that is fixed to the vehicle body 10. The radar device 11 is used for purposes such as collision avoidance, driving assistance, and automatic driving. For example, the radar device 11 is provided in the front part of the vehicle 1 and near the ground surface. The drive mechanism 15 includes, for example, an engine, a steering mechanism, a power transmission mechanism, and wheels.

Figure 2:
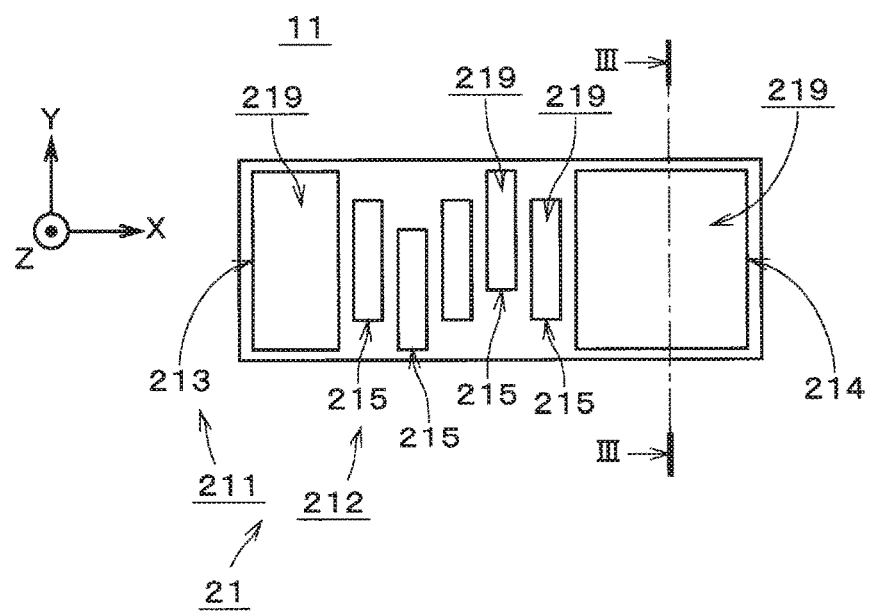
FIG. 2 is a front view of an antenna part.
Figure 3:
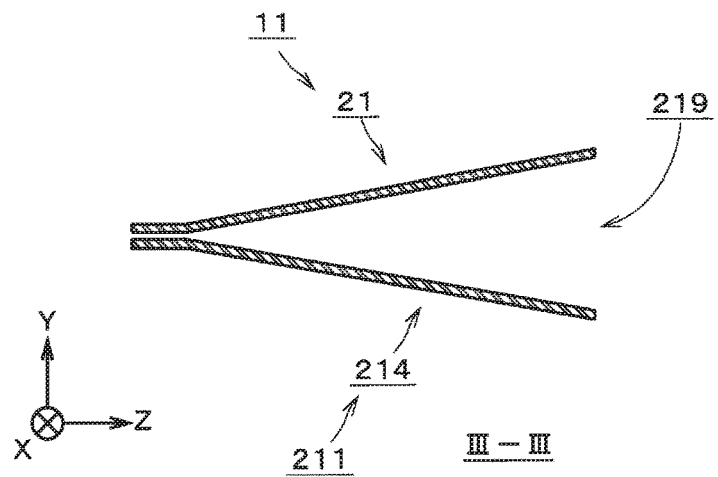
FIG. 3 is a cross-sectional view of the antenna part.

FIG. 2 is a front view of an antenna part 21 of the radar device 11. FIG. 3 is a cross-sectional view of the antenna part 21 taken at the position indicated by arrows III in FIG. 2. FIGS. 2 and 3 illustrate the antenna part 21 fixed to the vehicle body 10 of the vehicle 1, and X, Y, and Z directions in FIGS. 2 and 3 are the same as those in FIG. 1.

The antenna part 21 of the radar device 11 includes a transmitting antenna part 211 and a receiving antenna part 212. The transmitting antenna part 211 transmits transmission waves. The receiving antenna part 212 receives reflected waves arising from the transmission waves. The transmitting antenna part 211 includes a first transmitting antenna 213 and a second transmitting antenna 214. The first transmitting antenna 213 and the second transmitting antenna 214 are horn antennas, each having an aperture 219 parallel to an XY plane. The apertures 219 of the first transmitting antenna 213 and the second transmitting antenna 214 have rectangular shapes whose sides are parallel to the X and Y directions. The apertures 219 of the first transmitting antenna 213 and the second transmitting antenna 214 have the same length in the Y direction. The width in the X direction of the aperture 219 of the first transmitting antenna 213 is smaller than the width in the X direction of the aperture 219 of the second transmitting antenna 214. Thus, the first transmitting antenna 213 transmits a first transmission wave that has a wide range in radiation angle, and the second transmitting antenna 214 transmits a second transmission wave that has a different radiation pattern from the first transmission wave and has a narrower range in radiation angle than the first transmission wave has. That is, the transmitting antenna part 211 can transmit both the first transmission wave and the second transmission wave.

The receiving antenna part 212 includes a plurality of receiving antennas 215. In the example in FIG. 2, the receiving antenna part 212 includes five receiving antennas 215. Each receiving antenna 215 is a horn antenna and has an aperture 219 parallel to an XY plane. The aperture 219 of each receiving antenna 215 has a rectangular shape whose sides are parallel to the X and Y directions. The apertures 219 of the plurality of receiving antennas 215 have the same shape to one another. The length in the Y direction of the aperture 219 of each receiving antenna 215 is larger than the width in the X direction of the aperture 219 of the receiving antenna 215. That is, the longitudinal direction of the aperture 219 corresponds to the up-down direction.

Figure 4A:
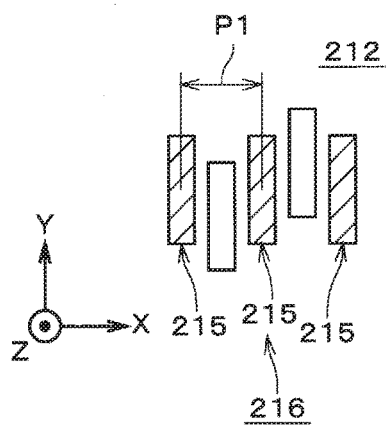
FIG. 4A illustrates a receiving antenna part.

The five receiving antennas 215 are arranged approximately in the X direction. Among the five receiving antennas 215, three receiving antennas 215 at both ends and in the middle in the X direction are arranged such that the centers of their apertures 219 are accurately aligned in the X direction. In the following description, a group of these three receiving antennas 215 is referred to as a "first antenna array," and the direction of alignment of receiving antennas 215 included in the first antenna array is referred to as a "first alignment direction." In FIG. 4A, the three receiving antennas 215 included in the first antenna array 216 are marked with diagonal hatching. The first alignment direction is perpendicular to the Z direction and parallel to the X direction. The three receiving antennas 215 in the first antenna array 216 are aligned with a constant first pitch P1 in the first alignment direction.

Figure 4B:
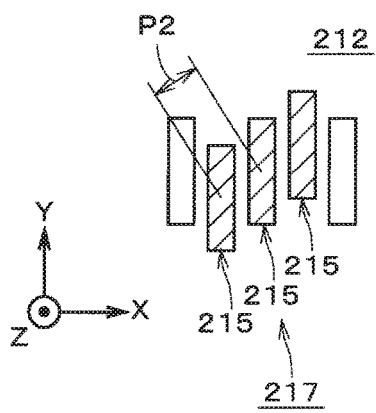
FIG. 4B illustrates the receiving antenna part.

Among the five receiving antennas 215, the remaining two receiving antennas 215 and the one receiving antenna 215 in the middle are arranged such that the centers of their apertures 219 are accurately aligned in a direction (hereinafter, referred to as a "second alignment direction") that is inclined with respect to the X direction. The second alignment direction is perpendicular to the Z direction and inclined with respect to the X direction. In the following description, a group of these three receiving antennas 215 aligned in the second alignment direction is referred to as a "second antenna array." In FIG. 4B, the three receiving antennas 215 included in the second antenna array 217 are marked with diagonal hatching. The three receiving antennas 215 in the second antenna array 217 are aligned with a constant second pitch P2 that is different from the first pitch P1 in the second alignment direction. The second pitch P2 is smaller than the first pitch P1. The first antenna array 216 and the second antenna array 217 share the middle receiving antenna 215. That is, one receiving antenna 215 included in the first antenna array 216 serves also as one of the receiving antennas 215 in the second antenna array 217.

Each horn antenna of the antenna part 21 is electrically or spatially connected to the structure for transmitting and receiving signals in the order of a monolithic microwave integrated circuit (MMIC), a transmission line (specifically, a micro-strip line, a transducer, and a waveguide), and a horn.

The aperture 219 of each receiving antenna 215 is regarded as an existence area in which the receiving antenna 215 exists. When the receiving antenna part 212 is viewed in the first alignment direction, the existence ranges in the Y direction of the two receiving antennas 215 in the second antenna array 217, excluding the middle receiving antenna 215, overlaps partially with the first antenna array 216. The existence range in the Y direction of the middle receiving antenna 215 overlaps entirely with the first antenna array 216. Thus, when the receiving antenna part 212 is viewed in the first alignment direction, at least part of the existence range in the Y direction of each receiving antenna 215 in the second antenna array 217 overlaps with the first antenna array 216.

Figure 5:
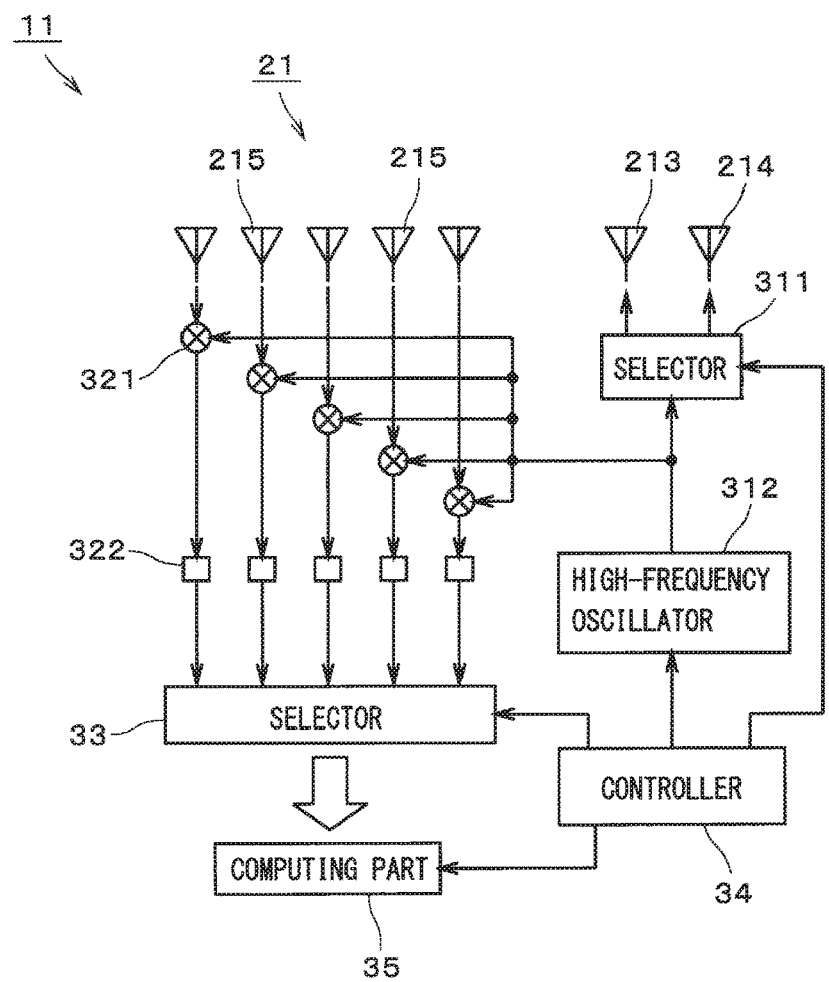
FIG. 5 is a block diagram schematically illustrating a configuration of a radar device.

FIG. 5 is a block diagram schematically illustrating a configuration of the radar device 11. The first transmitting antenna 213 and the second transmitting antenna 214 are connected to a selector 311. The selector 311 is connected to a high-frequency oscillator 312. This allows switching between the connection of the high-frequency oscillator 312 and the first transmitting antenna 213 and the connection of the high-frequency oscillator 312 and the second transmitting antenna 214. Thus, high-frequency electric power is supplied to either the first transmitting antenna 213 or the second transmitting antenna 214. That is, the transmission of the first transmission wave and the transmission of the second transmission wave are switchable. The present embodiment adopts a frequency-modulated continuous wave (FMCW) system that uses a relatively narrow frequency band, and the frequency of high-frequency signals received from the high-frequency oscillator 312 will fluctuate.

Each of the five receiving antennas 215 is connected to a mixer 321 and an AD converter 322 in this order. The AD converters 322 are connected to a selector 33. The receiving antenna 215 receives a reflected wave as a result of the transmission wave being reflected by an external object. A signal of the reflected wave obtained by the receiving antennas 215 and a circuit associated with the antennas is input to the mixer 321. The mixer 321 also receives input of a signal from the high-frequency oscillator 312 and combines the obtained signals to acquire a beat signal that indicates a difference in frequency between the transmission wave and the reflected wave. The beat signal is converted into a digital signal by the AD converter 322 and input to the selector 33.

The selector 33 selects at least some of the five beat signals and inputs the selected signals to a computing part 35. The computing part 35 converts the beat signals using Fourier transform and performs arithmetic processing on the transformed signals to obtain, for example, the position and speed of the object. The arithmetic processing performed by the computing part 35 will be described later. The selector 311, the high-frequency oscillator 312, the selector 33, and the computing part 35 are connected to a controller 34. The controller 34 controls these constituent elements to implement detection operations performed by the computing part 35.

Figure 6A:
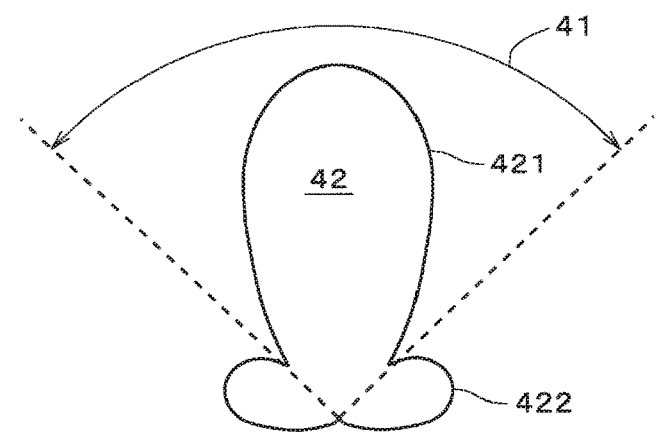
FIG. 6A illustrates a near-field monitoring mode.
Figure 6B:
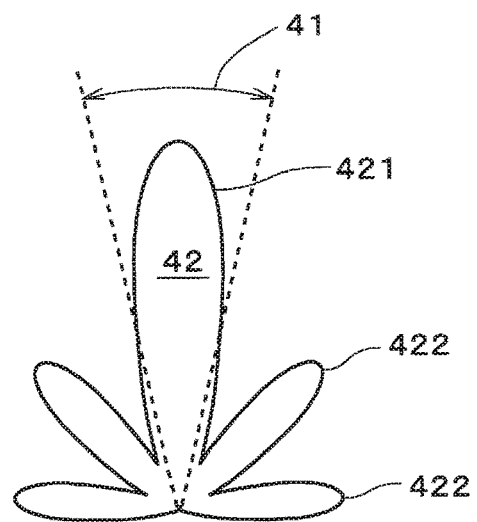
FIG. 6B illustrates a far-field monitoring mode.

The operations of the controller 34 involve a near-field monitoring mode and a far-field monitoring mode. FIG. 6A illustrates the near-field monitoring mode, and FIG. 6B illustrates the far-field monitoring mode. In FIGS. 6A and 6B, the bottom side corresponds to the antenna side, and the top side corresponds to the forward side of the vehicle 1. A range 41 indicates the range of radiation of transmission waves. The first transmitting antenna 213 and the second transmitting antenna 214 have side lobes that are sufficiently smaller than the main lobe. A pattern 42 indicates an antenna pattern of the receiving antenna part 212. Reference numeral 421 indicates the main lobe, and reference numeral 422 indicates the side lobes other than the main lobe 421.

In the near-field monitoring mode, the first transmitting antenna 213 transmits the first transmission wave under the control of the controller controlling the selector 311. Meanwhile, the signals derived from the three receiving antennas 215 included in the second antenna array 217 (see FIG. 4B) are input to the computing part 35 under the control of the controller 34 controlling the selector 33. A range of the main lobe 421 of the receiving antenna part 212 is widened by using the signals from the three receiving antennas 215 arranged with the relatively narrow second pitch P2. As a result, the near-field monitoring mode has lower azimuth resolution and a wider effective azimuth detection range than the far-field monitoring mode, which will be described later. As described previously, the first transmission wave has a wider range 41 in radiation angle than the second transmission wave has. Thus, the near-field monitoring mode can detect a wide range of objects.

In the far-field monitoring mode, the second transmitting antenna 214 transmits the second transmission wave under the control of the controller 34 controlling the selector 311. Meanwhile, among the five receiving antennas 215, only signals derived from the three receiving antennas 215 included in the first antenna array 216 (see FIG. 4A) are input to the computing part 35 under the control of the controller 34 controlling the selector 33. A range of the main lobe 421 of the receiving antenna part 212 is narrowed by using only the signals from the three receiving antennas 215 arranged with the relatively wide first pitch P1. On the other hand, the side lobes 422 become larger.

The second transmission wave is, however, not transmitted in the directions of the side lobes 422, as illustrated in FIG. 6B, because the second transmission wave has a narrow range 41 in radiation angle. In other words, in order to detect objects located far forward in the front side, radio waves are not radiated in directions deviating from the front side and thus requiring no monitoring. This achieves detection of reflected waves with the main lobe 421 while suppressing the influence of the side lobes 422. The far-field monitoring mode has high azimuth resolution and a narrow effective azimuth detection range. The far-field monitoring mode achieves detection of a remote and narrow range of objects.

For example, the near-field monitoring mode and the far-field monitoring mode are switchable at high speeds. That is, the first transmission wave and the second transmission wave are alternately transmitted under the control of the controller 34. Alternatively, an operation that involves two fixed-time transmissions of the first transmission wave and two fixed-time transmissions of the second transmission wave may be repeated. In this way, the first transmission wave and the second transmission wave are transmitted while being switched in a predetermined order.

Figure 7:
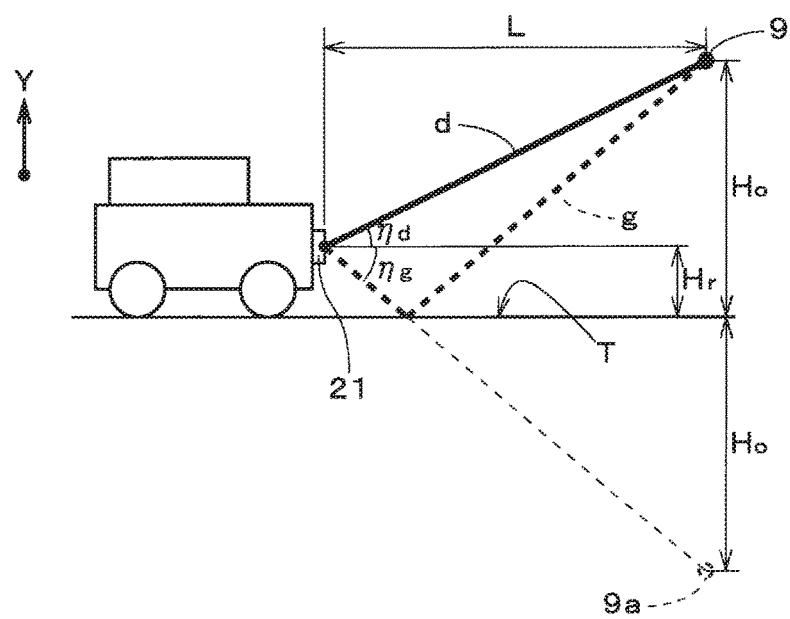
FIG. 7 illustrates the routes of reflected waves from an object to an antenna part.

Next is a description of the arithmetic processing of the computing part 35 for computing the elevation angle of an object. FIG. 7 illustrates the routes of reflected waves from an object 9 to the antenna part 21. A plane that includes line segments connecting the object 9 and the antenna part 21 is shown in FIG. 7. The reflected waves from the object 9 enter the antenna part 21 along a route d indicated by the bold solid line and a route g indicated by the bold broken line in FIG. 7. The reflected wave along the route d from the object 9 directly reaches the antenna part 21, and is thus hereinafter referred to as a "direct wave." The reflected wave along the route g reaches the antenna part 21 after travelling from the object 9 to the ground surface T and being reflected by the ground surface T, and is thus hereinafter referred to as a "ground reflected wave."

In FIG. 7, the ground surface T is perpendicular to the Y direction and horizontal. The elevation angle of the object 9 to be obtained by the computing part 35 is an angle $\eta_d$ formed by the route d of the direct wave and a horizontal plane perpendicular to the Y direction. An angle $\eta_g$ that is formed by the route g of the ground reflected wave in the vicinity of the antenna part 21 and the horizontal plane is a depression angle of a virtual object 9a, which may be set as will be described later. The depression angle $\eta_g$ is assumed to be negative in the following description.

Figure 8:
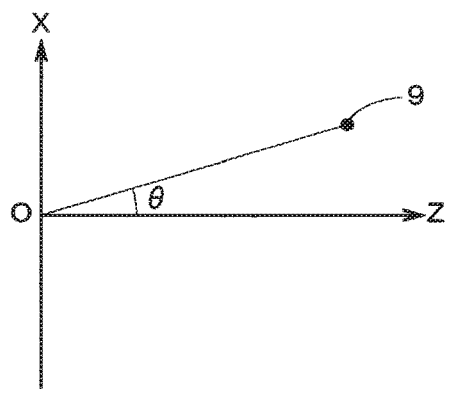
FIG. 8 illustrates a first detection angle.
Figure 9:
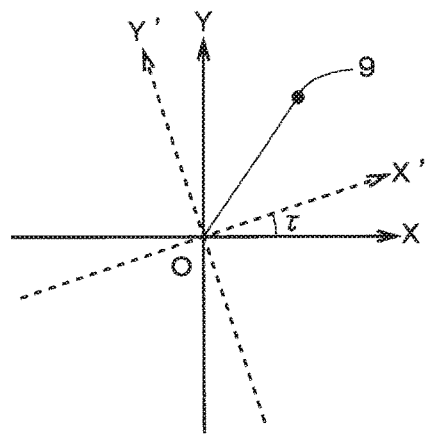
FIG. 9 illustrates a relative inclination angle.
Figure 10:
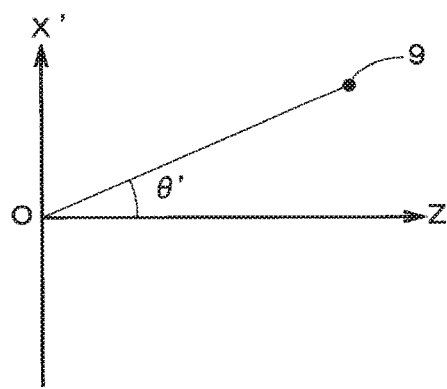
FIG. 10 illustrates a second detection angle.

As described previously, the first alignment direction of the first antenna array 216 is perpendicular to the Z direction, i.e., the reference direction, and parallel to the X direction. Thus, the computing part 35, by using the first antenna array 216, acquires a first detection angle θ that is formed by a direction from the antenna part 21 to the object 9 and the Z direction in a plane parallel to the Z and X directions as illustrated in FIG. 8. FIG. 8 and FIGS. 9 and 10, which will be described later, define the position of the antenna part 21 as the origin O. The first detection angle θ that goes counterclockwise about the origin O from the Z axis in FIG. 8 is positive, and the first detection angle θ that goes clockwise is negative. The same applies to a second detection angle, which will be described later. When viewed in the Y direction, the route d of the direct wave and the route g of the ground reflected wave in FIG. 7 overlap each other, and therefore the first detection angle for the direct wave and the first detection angle for the ground reflected wave are almost the same angle θ. Typically, one first detection angle θ is acquired. Two distances acquired using the first antenna array 216, i.e., the length of the route d of the direct wave and the length of the route g of the ground reflected wave, are different from each other.

The second alignment direction of the second antenna array 217 is perpendicular to the Z direction and inclined with respect to the X direction. That is, the second alignment direction is inclined with respect to a horizontal plane. Assuming that the second alignment direction is the X' direction and the direction perpendicular to the Z and X' directions is the Y' direction, the X' and Y' direction are inclined by an angle τ with respect to the X and Y directions as illustrated in FIG. 9. The angle τ is an angle formed by the first alignment direction and the second alignment direction and hereinafter referred to as a "relative inclination angle." The relative inclination angle τ is greater than 0° and less than 90°.

As illustrated in FIG. 10, the computing part 35, by using the second antenna array 217, acquires a second detection angle θ' that is formed by the direction from the antenna part 21 to the object 9 and the Z direction in a plane parallel to the Z and X' directions. In actuality, the second detection angle for the direct wave and the second detection angle for the ground reflected wave are different from each other because the route d of the direct wave and the route g of the ground reflected wave in FIG. 7 do not overlap each other when viewed in the Y' direction. FIG. 10 illustrates the second detection angle θ' for the direct wave. In the following description, the second detection angle for the direct wave is referred to as a "second detection angle $θ'_d$" and the second detection angle for the ground reflected wave is referred to as a "second detection angle $θ'_g$" to distinguish them. Using the second antenna array 217 that includes the three receiving antenna 215 allows the computing part 35 to simultaneously and separately detect the second detection angle $θ'_d$ for the direct wave and the second detection angle $θ'_g$ for the ground reflected wave.

Here, the position of the antenna part 21 is assumed to be the origin O, and coordinates of the object 9 in a coordinate system defined by X, Y, and Z axes (hereinafter, referred to as an "XYZ coordinate system") are expressed as (x, y, z). The coordinates (x, y, z) of the object 9 is expressed by Formula 1, where ρ is the length of the route d of the direct wave in FIG. 7, i.e., the direct distance between the object 9 and the antenna part 21, η is the elevation angle $η_d$, and θ is the first detection angle.

$z = ρ \cos η \cdot \cos θ$ $x = ρ \cos η \cdot \sin θ$ $y = ρ \sin η$ [Formula 1]

Also, the position of the antenna part 21 is assumed to be the origin O, and coordinates of the object 9 in a coordinate system defined by X', Y', and Z axes (hereinafter, referred to as the "X'Y'Z coordinate system") are expressed as (x', y', z). The coordinates (x', y', z) of the object 9 are expressed by Formula 2, where is the angle formed by the route d of the direct wave and a plane perpendicular to the Y' direction, and θ' is the second detection angle $θ'_d$ for the direct wave. In the X'Y'Z coordinate system that is an inclined coordinate system, the distance ρ between the object 9 and the antenna part 21 is the same as in the XYZ coordinate system that is a horizontal coordinate system.

$z = ρ \cos η' \cdot \cos θ'$ $x' = ρ \cos η \cdot \sin θ'$ $y' = ρ \sin η$ [Formula 2]

The variables x and y' in Formula 2 are expressed by Formula 3 using the variables x and y and the relative inclination angle τ.

$x' = ρ \cos η' \cdot \sin θ' = x \cos τ + y \sin τ$ $y' = ρ \sin η' = -x \sin τ + y \cos τ$ [Formula 3]

The equation of x' in Formula 3 is transformed into Formula 4 using the equation of z in Formula 2.

$x'/z = \tan θ' = x/z \cos τ + y/z \sin τ$ [Formula 4]

Formula 4 is transformed into Formula 5 using Formula 1.

$$\tan θ' = \tan θ \cdot \cos τ + \frac{\tan η}{\cos θ} \sin τ$$ [Formula 5]

Solving Formula 5 for η yields Formula 6.

$$η = \tan^{-1}\left(\frac{\tan θ' \cdot \cos θ - \sin θ \cdot \cos τ}{\sin τ}\right)$$ [Formula 6]

While the direct wave is described using Formulas 1 to 6, the same applies to the ground reflected wave. More specifically, the virtual object 9a is set at a position that is symmetric to the position of the object 9 on the ground surface T in FIG. 7. Coordinates (x, y, z) of the virtual object 9a in the XYZ coordinate system are expressed by Formula 1, where ρ is the length of the route g of the ground reflected wave, i.e., the direct distance between the virtual object 9a and the antenna part 21, η is the depression angle $η_g$ of the virtual object 9a, and θ is the first detection angle. Coordinates (x', y', z) of the virtual object 9a in the X'Y'Z coordinate system are expressed by Formula 2, where η' is the angle formed by the route g of the ground reflected wave in the vicinity of the antenna part 21 and a plane perpendicular to the Y' direction, and θ' is the second detection angle $θ'_g$ for the ground reflected wave. Formulas 3 to 6 are transformed in the same way as described above.

Accordingly, substituting the second detection angle $θ'_d$ of the direct wave for θ' in Formula 6 after substituting the values of the first detection angle θ and the relative inclination angle τ into Formula 6 yields the elevation angle $η_d$ of the object 9 as η. Also, substituting the second detection angle $θ'_g$ of the ground reflected wave for θ' in Formula 6 yields the depression angle $η_g$ of the virtual object 9a as η.

In actual processing, the computing part 35 acquires two second detection angles by using the second antenna array 217 and calculates η from each second detection angle by using Formula 6. The calculated value η that is positive is regarded as the elevation angle $η_d$ of the object 9, and the calculated value η that is negative is regarded as the depression angle $η_g$ of the virtual object 9a.

As described above, the receiving antenna part 212 includes the first antenna array 216 of three receiving antennas 215 arranged in the first alignment direction, and the second antenna array 217 of three receiving antennas 215 arranged in the second alignment direction different from the first alignment direction. The receiving antenna part 212 receives both the ground reflected wave and the direct wave as reflected waves. The computing part 35 obtains the elevation angle of the object 9 with respect to a horizontal plane by using the first detection angle acquired using the first antenna array 216, the second detection angle acquired using the second antenna array 217 on the basis of the direct wave, and the relative inclination angle. This allows the computing part 35 to easily obtain the elevation angle of the object 9 without the need to perform complicated processing such as correction processing.

When the receiving antenna part 212 is viewed in the first alignment direction, at least part of the existence range of each receiving antenna 215 included in the second antenna array 217 in the Y direction perpendicular to the Z direction overlaps with the first antenna array 216. This narrows the existence range in the Y direction of the receiving antennas 215 in the directions of the apertures 219 of all the receiving antennas 215 included in the receiving antenna part 212 intersect with the first alignment direction and the second alignment direction and all are the same direction. This increases aperture areas of the receiving antennas 215 while narrowing the pitches of the receiving antennas 215 and reducing grating lobes.

In the receiving antenna part 212, the first pitch P1 of the receiving antennas 215 in the first antenna array 216 is different from the second pitch P2 in the second antenna array 217. This achieves both the monitoring mode with low azimuth resolution and a wide effective azimuth detection range, and the monitoring mode with high azimuth resolution and a narrow effective azimuth detection range. The near-field monitoring mode and the far-field monitoring mode can be achieved with the transmitting antenna part 211 transmitting both the first transmission wave with a wide radiation range and the second transmission wave with a narrow radiation range.

Figure 11A:
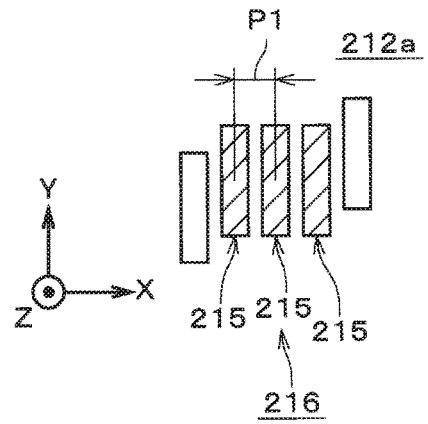
FIG. 11A illustrates another example of the receiving antenna part.
Figure 11B:
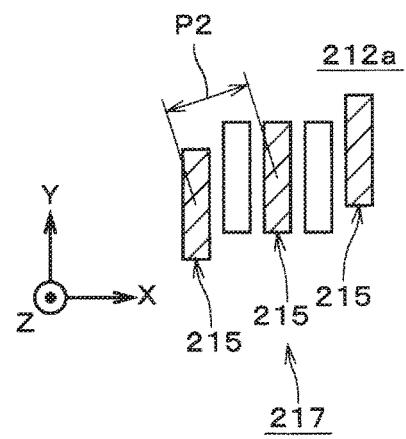
FIG. 11B illustrates another example of the receiving antenna part.

The arrays of the receiving antennas 215 in the receiving antenna part 212 may be modified in various ways. For example, a receiving antenna part 212a illustrated in FIGS. 11A and 11B includes five receiving antennas 215 among which receiving antennas 215 at both ends are deviated respectively on the +Y and −Y sides. As indicated by diagonal hatching in FIG. 11A, three receiving antennas 215 that are sandwiched between the deviated receiving antennas 215 at both ends are aligned as a first antenna array 216 in a first alignment direction parallel to the X direction. As indicated by diagonal hatching in FIG. 11B, three receiving antennas 215 at both ends and in the middle are arranged as a second antenna array 217 in a second alignment direction that is inclined with respect to the X direction. The first pitch P1 in the first antenna array 216 is smaller than the second pitch P2 in the second antenna array 217.

Figure 12A:
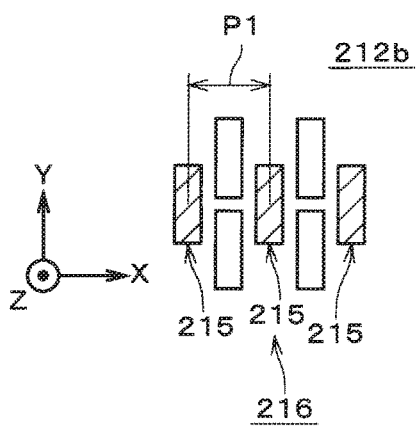
FIG. 12A illustrates yet another example of the receiving antenna part.
Figure 12B:
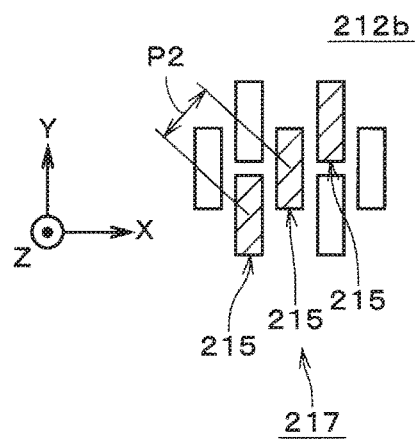
FIG. 12B illustrates yet another example of the receiving antenna part.
Figure 12C:
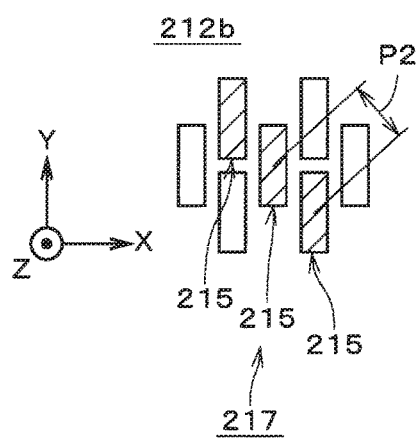
FIG. 12C illustrates yet another example of the receiving antenna part.

A receiving antenna part 212b illustrated in FIGS. 12A to 12C includes seven receiving antennas 215. As indicated by diagonal hatching in FIG. 12A, three receiving antennas 215 at both ends and in the middle in the X direction are arranged as a first antenna array 216 in a first alignment direction parallel to the X direction. As indicated by diagonal hatching in FIG. 12B, the middle receiving antenna 215 and two receiving antennas 215 that are located in the upper right and lower left of the middle receiving antenna 215 are arranged as a second antenna array 217 in a second alignment direction that is inclined with respect to the X direction. As indicated by diagonal hatching in FIG. 12C, the middle receiving antenna 215 and two receiving antennas 215 that are located in the upper left and lower right of the middle receiving antenna 215 are arranged as another second antenna array 217 in another second alignment direction that is inclined with respect to the X direction. The two second antenna arrays 217 have the same second pitch P2. The first pitch P1 in the first antenna array 216 is larger than the second pitch P2 in each second antenna array 217.

In the receiving antenna parts 212a and 212b described above, the first antenna array 216 and the second antenna array(s) 217 each include three receiving antennas 215. When the receiving antenna part is viewed in the first alignment direction, at least part of the existence range in the Y direction of each receiving antenna 215 included in the second antenna array(s) 217 overlaps with the first antenna array 216. This allows the elevation angle of the object to be easily obtained while narrowing the existence ranges in the Y direction of the receiving antennas 215. Using the different first and second pitches P1 and P2 achieves both the monitoring mode with low azimuth resolution and a wide effective azimuth detection range, and the monitoring mode with high azimuth resolution and a narrow effective azimuth detection range.

In general, an antenna array requires (N+1) receiving antennas to separately detect N reflected waves, where N is an integer of two or more. Thus, importantly each of the first antenna array 216 and the second antenna array(s) 217 include three or more receiving antennas 215 in order to simultaneously and separately detect the detection angle for the direct wave and the detection angle for the ground reflected wave.

Figure 13:
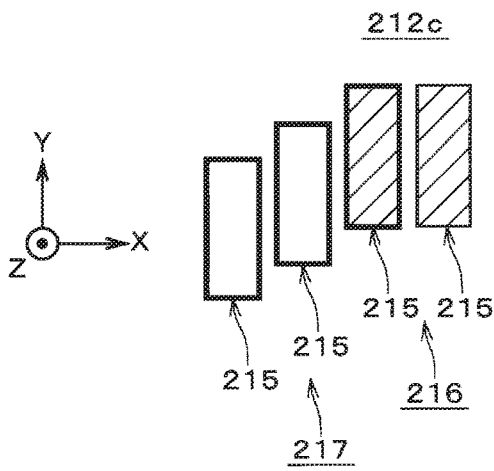
FIG. 13 illustrates yet another example of the receiving antenna part.
Figure 14:
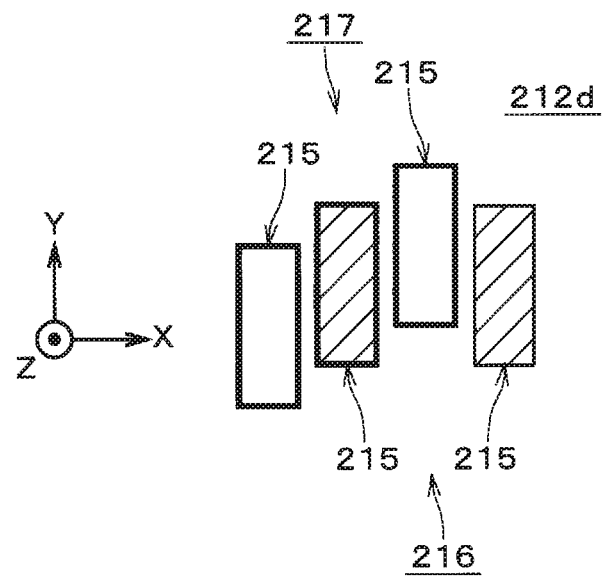
FIG. 14 illustrates yet another example of the receiving antenna part.
Figure 15:
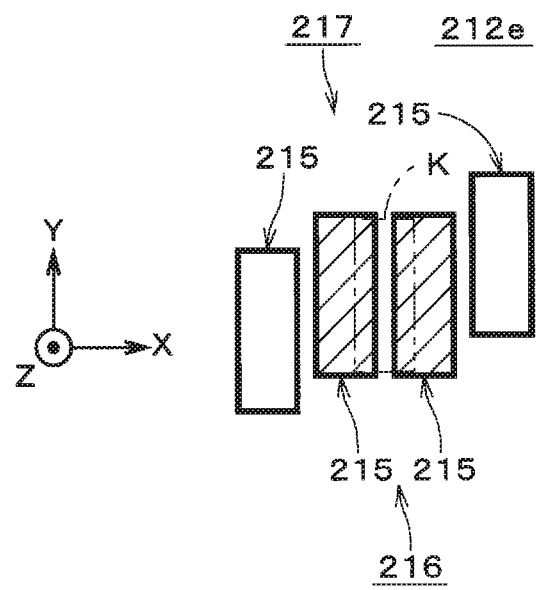
FIG. 15 illustrates yet another example of the receiving antenna part.

As described previously, the first detection angle for the direct wave and the first detection angle for the ground reflected wave are the same when the first alignment direction of the first antenna array 216 is a horizontal direction. In this case, the number of receiving antennas 215 included in the first antenna array 216 may be two or more. In other words, it is possible to use receiving antenna parts 212c to 212e that include four receiving antennas 215 as illustrated in FIGS. 13 to 15. In FIGS. 13 to 15, receiving antennas 215 included in a first antenna array 216 are marked with diagonal hatching, and receiving antennas 215 included in a second antenna array 217 are indicated by rectangles in thick lines.

In the receiving antenna part 212c illustrated in FIG. 13, the receiving antenna 215 furthest to the +X side and the receiving antenna 215 adjacent on the −X side to the receiving antenna 215 furthest to the +X side are treated as a first antenna array 216 in a first alignment direction that is a horizontal direction. Three receiving antennas 215, excluding the receiving antenna 215 furthest to the +X side, are arranged as a second antenna array 217 in a second alignment direction that is inclined with respect to the first alignment direction. In the example in FIG. 13, the two receiving antennas 215 included in the first antenna array 216 are used to acquire the first detection angle for the combined wave of the direct wave and the ground reflected wave. The first detection angle for the combined wave is the same as the first detection angle for the direct wave and the first detection angle for the ground reflected wave, and therefore the first detection angle for the direct wave and the first detection angle for the ground reflected wave are substantially acquired using the first antenna array 216.

In the receiving antenna part 212d illustrated in FIG. 14, the first and third receiving antennas 215 from the +X side toward the −X direction are arranged as a first antenna array 216 in a first alignment direction that is a horizontal direction. The arrangement of receiving antennas 215 included in a second antenna array 217 is the same as in the example in FIG. 13. In the example in FIG. 14, the pitch of the two receiving antennas 215 included in the first antenna array 216 is greater than that in the first antenna array 216 in FIG. 13, and the effective azimuth detection range is narrower.

In the receiving antenna part 212d, the maximum value of deviation in the Y direction between the receiving antennas 215 included in the second antenna array 217 and the receiving antennas 215 included in the first antenna array 216 is smaller than that in the receiving antenna part 212c in FIG. 13. Thus, in cases such as where an object is located far away and the elevation angle of the object is so small that it is difficult or unnecessary to acquire, all of the four receiving antennas 215 may be used to obtain the azimuth angle of an object, for example. In this case, various types of arithmetic processing are performed, assuming that the four receiving antennas 215 are located at the same position in the Y direction, i.e., the four receiving antennas 215 are regarded as an antenna array arranged in a horizontal direction. This improves radar performance such as resolution, as compared with the case of using only the two receiving antennas 215 included in the first antenna array 21. The other receiving antenna parts may also use the above-described technique in which when the acquisition of the elevation angle of an object is unnecessary, the receiving antennas 215 included in only the second antenna array 217 are used together with the receiving antennas 215 included in the first antenna array 216 to obtain the azimuth angle in a horizontal direction. In the case of using this technique, the accuracy of detection increases as the amount of deviation in the Y direction of the receiving antennas 215 decreases.

In the receiving antenna part 212e illustrated in FIG. 15, receiving antennas 215 at both ends, among the four receiving antennas 215, are deviated respectively on the +Y and −Y sides. Two receiving antennas 215 that are sandwiched between the receiving antennas 215 at both ends are arranged as a first antenna array 216 in a first alignment direction that is a horizontal direction. In the example in FIG. 15, a phase signal at a virtual receiving antenna indicated by a rectangle K with a chain double-dashed line can be acquired by obtaining a complex sum of signals received by the two receiving antennas 215 in the first antenna array. In the receiving antenna part 212e, therefore, the two receiving antennas 215 included in the first antenna array 216 also serve as a receiving antenna 215 in a second antenna array 217. It can also be said that, in the second antenna array 217, the receiving antennas 215 at both ends and the virtual receiving antenna (see the rectangle K) are arranged in a second alignment direction that is inclined with respect to the first alignment direction.

As described previously, the examples in FIGS. 13 to 15 are based on the assumption that the first alignment direction of the first antenna array 216 is a horizontal direction. If the first alignment direction is not a horizontal direction, the first detection angle for the direct wave and the first detection angle for the ground reflected wave are different and therefore, importantly, the first antenna array 216 includes three or more receiving antennas 215. The number of receiving antennas 215 is preferably high in order to improve radar performance. From this viewpoint, even if the first alignment direction is a horizontal direction, the first antenna array 216 preferably includes three or more receiving antennas 215.

In FIG. 7, Formula 7 holds true, where $H_o$ is the distance from the ground surface T to the object 9, i.e., the height of the object 9 in the Y direction, $H_r$ is the height of the antenna part 21, and L is the horizontal distance from the antenna part 21 to the object 9. The depression angle $\eta_g$ is negative.

$$H_o - H_r = L \tan \eta_d$$

$$H_o + H_r = -L \tan \eta_g \qquad \text{[Formula 7]}$$

Deleting $H_o$ from the two equations in Formula 7 and solving for $\eta_g$ yields Formula 8.

$$\eta_g = -\tan^{-1}\left(\tan \eta_d + \frac{2H_r}{\rho \cos \eta_d}\right) \qquad \text{[Formula 8]}$$

As described previously, substituting the two second detection angles acquired using the second antenna array 217 into Formula 6 yields the elevation angle $\eta_d$ that is positive and the depression angle $\eta_g$ that is negative. Formula 8 above expresses the relationship between the elevation angle $\eta_d$ of the object 9 and the depression angle $\eta_g$ of the virtual object 9a corresponding to the object 9. Alternatively, depending on the processing performed by the computing part 35, only the depression angle $\eta_g$ of the virtual object 9a may be first obtained, and then the elevation angle $\eta_d$ of the object 9 may be obtained using the depression angle $\eta_g$ and Formula 8.

The radar device 11 may be configured to be able to detect the elevation angles of two objects. In this case, the first antenna array 216 and the second antenna array 217 each typically include five or more receiving antennas 215 in order to separately detect direct waves and ground reflected waves from the two objects. The first antenna array 216 acquires a first detection angle $\theta_{Ad}$ for the direct wave and a first detection angle $\theta_{Ag}$ for the ground reflected wave for one of the objects, and also acquires a first detection angle $\theta_{Bd}$ for the direct wave and a first detection angle $\theta_{Bg}$ for the ground reflected wave for the other object. Similarly, the second antenna array 217 acquires a second detection angle $\theta'_{Ad}$ for the direct wave and a second detection angle $\theta'_{Ag}$ for the ground reflected wave for one of the objects, and also acquires a second detection angle $\theta'_{Bd}$ for the direct wave and a second detection angle $\theta'_{Bg}$ for the ground reflected wave for the other object. At this time, it is unclear which of the two objects corresponds to each of the four second detection angles and which of the two waves, direct wave and ground reflected wave, corresponds to each of the four second detection angles. The same applies to the four first detection angles.

The first detection angle $\theta_{Ad}$ and the first detection angle $\theta_{Ag}$ are approximately of the same value, and the first detection angle $\theta_{Bd}$ and the first detection angle $\theta_{Bg}$ are approximately of the same value. Thus, typically two first detection angles are acquired. In this case, the four second detection angles $\theta'_{Ad}$, $\theta'_{Ag}$, $\theta'_{Bd}$, and $\theta'_{Bg}$ are respectively combined with one of the first detection angles to obtain four angles $\eta$ from Formula 6. The four second detection angles $\theta'_{Ad}$, $\theta'_{Ag}$, $\theta'_{Bd}$, and $\theta'_{Bg}$ are respectively combined with the other first detection angle to obtain four angles $\eta$ from Formula 6.

As described previously, angles η that are positive are regarded as elevation angles $\eta_d$ of objects, and angles η that are negative are regarded as depression angles $\eta_g$ of virtual objects. Thus, four angles η are identified as candidates for the elevation angles $\eta_d$ of the two objects, and four angles η are identified as candidates for the depression angles $\eta_g$ of the two virtual objects. At this time, a plurality of candidates for the direct distance ρ between each of the two objects and the antenna part 21 are also acquired. Accordingly, each combination of the four candidates for the elevation angle $\eta_d$, the four candidates for the depression angle $\eta_g$, and the candidates for the direct distance ρ are substituted into Formula 8, and a combination that satisfies Formula 8 is acquired as the elevation angle $\eta_d$, the depression angle $\eta_g$, and the direct distance ρ for each object. This allows the elevation angles of the two objects to be easily obtained. The radar device 11 may also be configured to be able to detect the elevation angles of three or more objects.

The radar device 11 and the vehicle 1 may be modified in various ways.

The first alignment direction may be inclined with respect to a horizontal direction. In this case, Formula 6 is appropriately modified so that the elevation angle of an object with respect to a horizontal plane can be easily obtained using the first detection angle, the second detection angle, and the relative inclination angle.

The receiving antenna part 212 may completely separate receiving antennas 215 included in the first antenna array 216 and receiving antennas 215 included in the second antenna array 217. However, from the viewpoint of efficiently using the receiving antennas 215, one receiving antenna 215 included in the first antenna array 216 preferably serves also as a receiving antenna 215 in the second antenna array 217.

In the second antenna array 217 of the receiving antenna part 212 illustrated in FIGS. 12A to 12C, the existence range in the Y direction of the receiving antennas 215 slightly increases because the receiving antennas 215 at both ends are away from each other in the Y direction. In order to further reduce the existence range in the Y direction of the receiving antennas 215, when the receiving antenna part is viewed in the first alignment direction, the existence ranges in the Y direction of all receiving antennas 215 included in the second antenna array 217 preferably overlap partially with one another.

The transmitting antennas 213 and 214 and the receiving antennas 215 may be antennas other than horn antennas.

One of the transmitting antennas may include a mechanism for changing the antenna pattern so that the first transmission wave and the second transmission wave are both transmitted from that single transmitting antenna.

The radar device 11 may be provided in the rear part of the vehicle 1 for the purpose of rear monitoring. Alternatively, the radar device 11 may be mounted to the interior of a vehicle.

The vehicle 1 is not limited to a passenger car and may be other vehicles for use in various applications, such as a truck or a train. The vehicle 1 is not limited to a man-driven vehicle, and may be an unmanned operation vehicle such as an automated guided vehicle used in a factory.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2015-251953 filed in the Japan Patent Office on Dec. 24, 2015, the entire disclosure of which is incorporated herein by reference.

INDUSTRIAL APPLICABILITY

The radar device according to the present invention can be mounted on a vehicle for use in various applications.

REFERENCE SIGNS LIST

1 Vehicle
9 Object
10 Vehicle body
11 On-vehicle radar device
35 Operation part
211 Transmitting antenna part
212, 212a to 212e Receiving antenna part
215 Receiving antenna
216 First antenna array
217 Second antenna array
219 Aperture
θ First detection angle
θ' Second detection angle
τ Relative inclination angle
$\eta_d$ Elevation angle
P1 First pitch
P2 Second pitch
T Ground surface

The invention claimed is:

1. An on-vehicle radar device comprising:
a transmitting antenna part for transmitting a transmission wave;
a receiving antenna part for receiving a reflected wave arising from the transmission wave; and
a computing part for receiving a signal from the receiving antenna part;
wherein the receiving antenna part includes:
a first antenna array with a plurality of receiving antennas arranged in a first direction perpendicular to a predetermined reference direction; and
a second antenna array with three or more receiving antennas arranged in a second direction that is perpendicular to the reference direction and different from the first direction,
when the first direction is a horizontal direction in a state in which the on-vehicle radar device is fixed to a vehicle body of a vehicle, the number of the plurality of receiving antennas included in the first antenna array is two or more, and when the first direction is not a horizontal direction, the number of the plurality of receiving antennas is three or more,
when the receiving antenna part is viewed in the first direction, at least part of an existence range of each receiving antenna included in the second antenna array in a direction perpendicular to the reference direction overlaps with that of the first antenna array, and
the computing part computes an elevation angle of an object with respect to a horizontal plane, using a first detection angle, a second detection angle, and a relative inclination angle, where the first detection angle being an angle formed by the reference direction and a direction of the object acquired using the first antenna array in a plane that is parallel to both the reference direction and the first direction, the second detection angle being an angle formed by the reference direction and a direction of the object acquired using the second antenna array in a plane that is parallel to both the reference direction and the second direction, and the relative inclination angle being an angle formed by the first direction and the second direction.

2. The on-vehicle radar device according to claim 1, wherein
the receiving antenna part receives a ground reflected wave and a direct wave as the reflected wave, the ground reflected wave reaching the receiving antenna part via a ground surface from the object, and the direct wave reaching the receiving antenna part directly from the object;
the second direction is inclined with respect to the horizontal plane in a state in which the on-vehicle radar device is fixed to a vehicle body of a vehicle; and the computing part acquires the second detection angle for the direct wave and the second detection angle for the ground reflected wave, using the second antenna array.

3. The on-vehicle radar device according to claim 1, wherein
at least one receiving antenna included in the first antenna array serves also as a receiving antenna of the second antenna array.

4. The on-vehicle radar device according to claim 2, wherein
at least one receiving antenna included in the first antenna array serves also as a receiving antenna of the second antenna array.

5. The on-vehicle radar device according to claim 1, wherein
when the receiving antenna part is viewed in the first direction, existence ranges of all receiving antennas included in the second antenna array in a direction perpendicular to the reference direction overlap partially with one another.

6. The on-vehicle radar device according to claim 2, wherein
when the receiving antenna part is viewed in the first direction, existence ranges of all receiving antennas included in the second antenna array in a direction perpendicular to the reference direction overlap partially with one another.

7. The on-vehicle radar device according to claim 3, wherein
when the receiving antenna part is viewed in the first direction, existence ranges of all receiving antennas included in the second antenna array in a direction perpendicular to the reference direction overlap partially with one another.

8. The on-vehicle radar device according to claim 4, wherein
when the receiving antenna part is viewed in the first direction, existence ranges of all receiving antennas included in the second antenna array in a direction perpendicular to the reference direction overlap partially with one another.

9. The on-vehicle radar device according to claim 1, wherein
each receiving antenna included in the first antenna array and each receiving antenna included in the second antenna array have an aperture, a plane on which the aperture exists is perpendicular to the reference direction, and a dimension of the aperture in a direction that intersects with the first direction and the second direction is longer than those in other directions.

10. The on-vehicle radar device according to claim 8, wherein
each receiving antenna included in the first antenna array and each receiving antenna included in the second antenna array have an aperture, a plane on which the aperture exists is perpendicular to the reference direction, and a dimension of the aperture in a direction that intersects with the first direction and the second direction is longer than those in other directions.

11. The on-vehicle radar device according to claim 9, wherein
a longitudinal direction of the aperture corresponds to an up-down direction in a state in which the on-vehicle radar device is fixed to a vehicle body of a vehicle.

12. The on-vehicle radar device according to claim 10, wherein
a longitudinal direction of the aperture corresponds to an up-down direction in a state in which the on-vehicle radar device is fixed to a vehicle body of a vehicle.

13. The on-vehicle radar device according to claim 1, wherein
the plurality of receiving antennas of the first antenna array are arranged with a constant first pitch in the first direction; and
the three or more receiving antennas of the second antenna array are arranged with a constant second pitch that is different from the first pitch, in the second direction.

14. The on-vehicle radar device according to claim 3, wherein
the plurality of receiving antennas of the first antenna array are arranged with a constant first pitch in the first direction; and
the three or more receiving antennas of the second antenna array are arranged with a constant second pitch that is different from the first pitch, in the second direction.

15. The on-vehicle radar device according to claim 12, wherein
the plurality of receiving antennas of the first antenna array are arranged with a constant first pitch in the first direction; and
the three or more receiving antennas of the second antenna array are arranged with a constant second pitch that is different from the first pitch, in the second direction.

16. The on-vehicle radar device according to claim 13, wherein
the transmitting antenna part transmits either a first transmission wave having a wider range in radiation angle or a second transmission wave having a narrower range in radiation angle by switching, the narrower range being narrower than the wider range in radiation angle.

17. The on-vehicle radar device according to claim 14, wherein
the transmitting antenna part transmits either a first transmission wave having a wider range in radiation angle or a second transmission wave having a narrower range in radiation angle by switching, the narrower range being narrower than the wider range in radiation angle.

18. The on-vehicle radar device according to claim 1, wherein
the first direction is a horizontal direction in a state in which the on-vehicle radar device is fixed to a vehicle body of a vehicle, and the elevation angle $\eta$ of the object with respect to the horizontal plane is computed by using a formula of:

$$\eta=\tan^{-1}\{(\tan\theta'\cdot\cos\theta-\sin\theta\cdot\cos\tau)/\sin\tau\},$$

where $\tau$ is the relative inclination angle, $\theta$ is the first detection angle, and $\theta'$ is the second detection angle.

19. The on-vehicle radar device according to claim 2, wherein
- the first direction is a horizontal direction in a state in which the on-vehicle radar device is fixed to a vehicle body of a vehicle, and
- the elevation angle $\eta$ of the object with respect to the horizontal plane is computed by using a formula of:

$$\eta=\tan^{-1}\{(\tan\theta'\cdot\cos\theta-\sin\theta\cdot\cos\tau)/\sin\tau\},$$

where $\tau$ is the relative inclination angle, $\theta$ is the first detection angle, and $\theta'$ is the second detection angle.

20. The on-vehicle radar device according to claim 3, wherein
- the first direction is a horizontal direction in a state in which the on-vehicle radar device is fixed to a vehicle body of a vehicle, and
- the elevation angle $\eta$ of the object with respect to the horizontal plane is computed by using a formula of:

$$\eta=\tan^{-1}\{(\tan\theta'\cdot\cos\theta-\sin\theta\cdot\cos\tau)/\sin\tau\},$$

where $\tau$ is the relative inclination angle, $\theta$ is the first detection angle, and $\theta'$ is the second detection angle.

* * * * *